United States Patent [19]
Braunberger

[11] 3,908,398
[45] Sept. 30, 1975

[54] ARTICULATED VEHICLE ASSEMBLY

[75] Inventor: Benjamin A. Braunberger, West Bend, Wis.

[73] Assignee: GEHL Company, West Bend, Wis.

[22] Filed: Mar. 29, 1974

[21] Appl. No.: 456,248

[52] U.S. Cl. .................. 64/6; 64/23; 74/15.69; 56/15.7; 180/14 B
[51] Int. Cl.² ........................................ F16D 3/00
[58] Field of Search ......... 56/14.7, 14.9, 15.7, 15.5, 56/DIG. 14; 64/6, 23; 403/85; 180/14 B; 74/15.6, 15.69, 15.8

[56] References Cited
UNITED STATES PATENTS

| | | | |
|---|---|---|---|
| 2,097,703 | 11/1937 | Ronning | 74/15.6 |
| 2,614,405 | 10/1952 | Clausen | 64/23 |
| 3,483,683 | 12/1969 | McCanse | 64/23 |
| 3,800,556 | 4/1974 | Duerksen | 64/6 |

*Primary Examiner*—Samuel Scott
*Assistant Examiner*—Randall Heald
*Attorney, Agent, or Firm*—James E. Nilles

[57] ABSTRACT

A draft connection between a tractor and a trailing implement provides a pivot center at a relatively short rearward spacing from the tractor power take-off shaft and at a relatively long forward spacing from a forwardly extending drive shaft on the implement. An extension shaft is universally pivoted at its rear end to the implement drive shaft, and a torque transmitting telescopic shaft assembly is universally pivoted at one end to the power take-off shaft and at its other end to the forward end of the extension shaft. The forward end of the extension shaft is guided for horizontal back and forth swinging movement about its pivot connection with the implement drive shaft, whereby the range of horizontal angular displacement of the tractor and implement about the pivot center of the draft connection is enlarged beyond a normal range in which rotation of the power take-off shaft is transmitted to the implement drive shaft at constant angular velocity.

11 Claims, 17 Drawing Figures

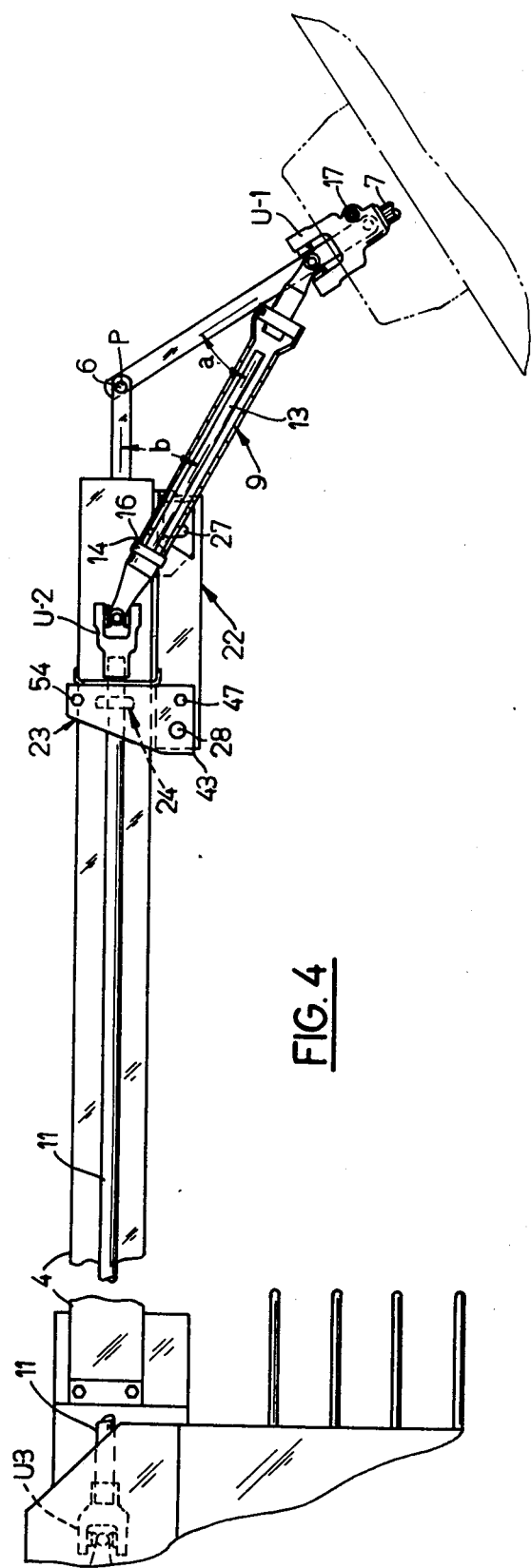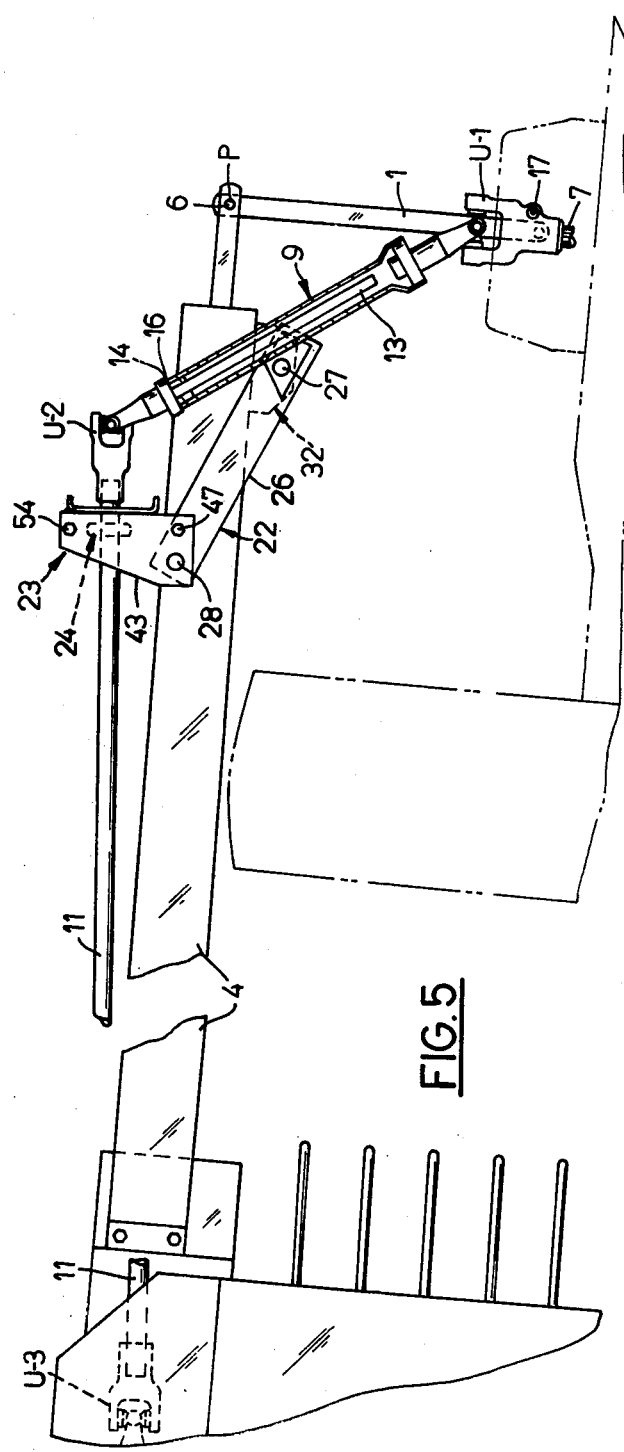

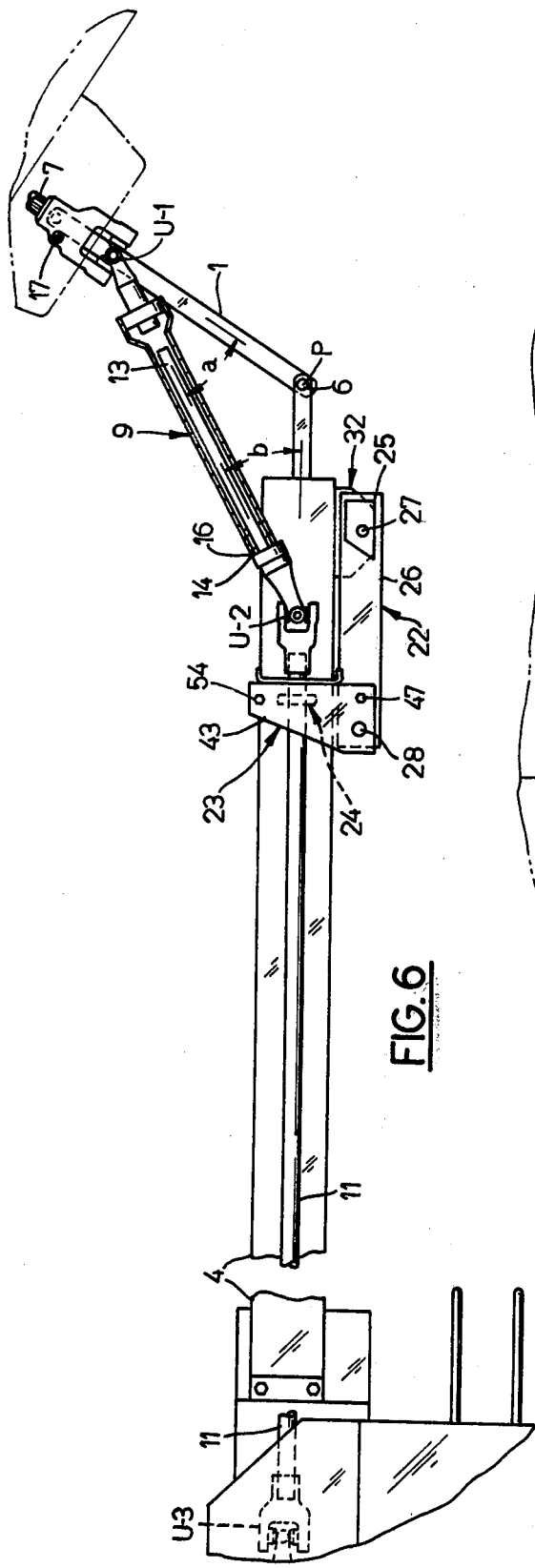
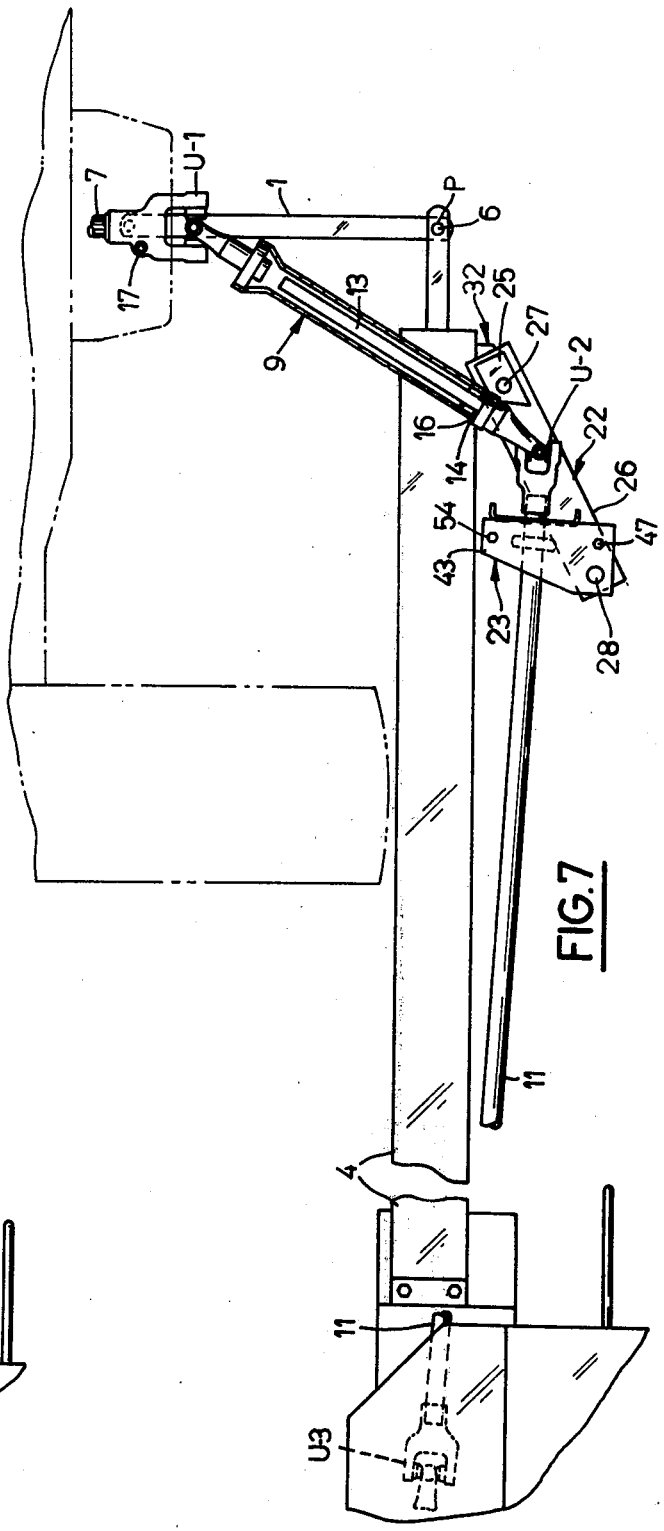

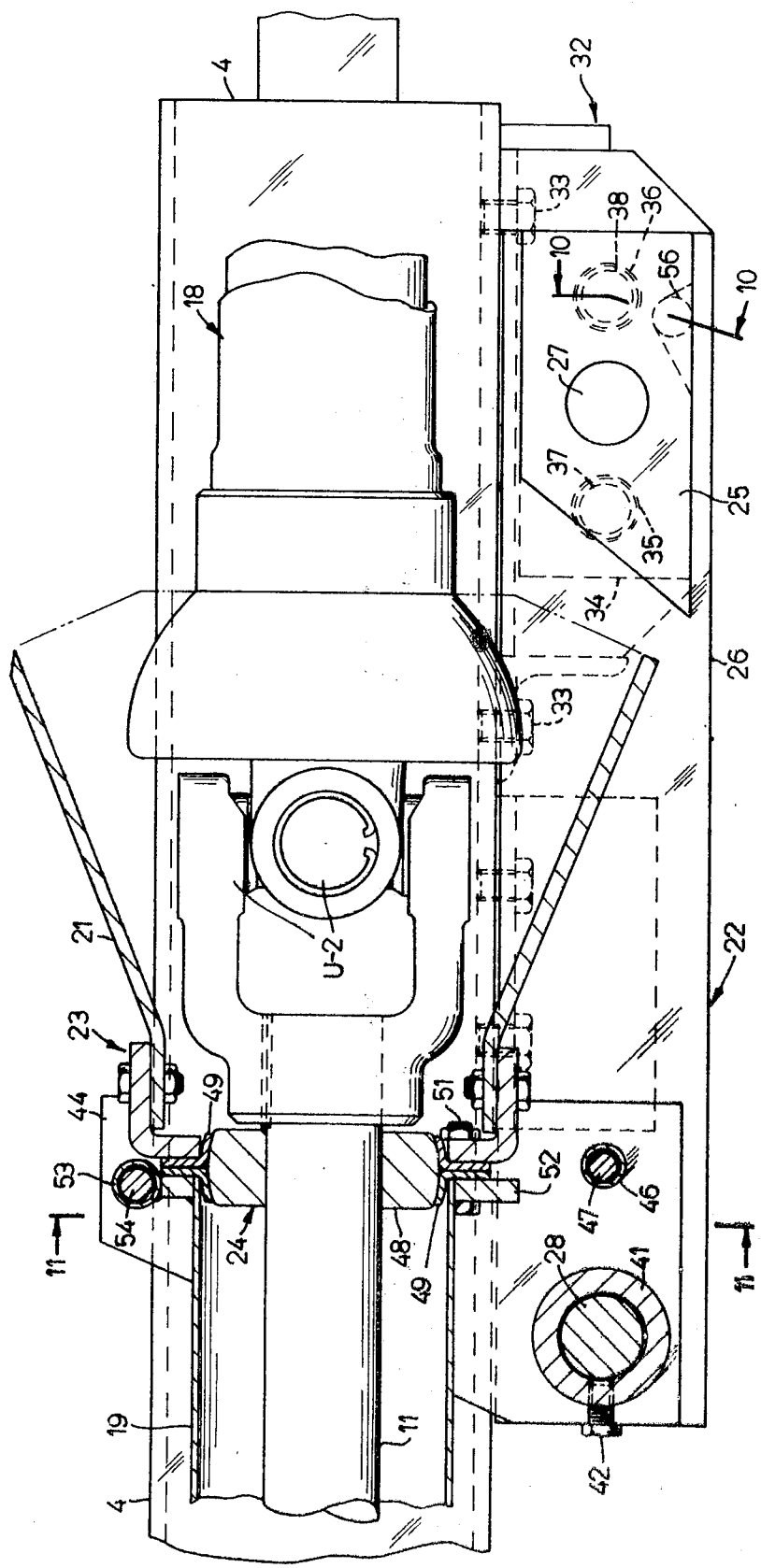
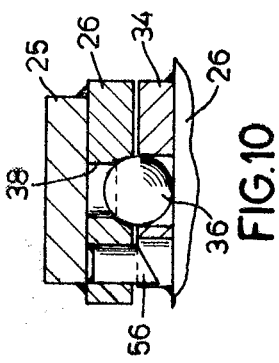
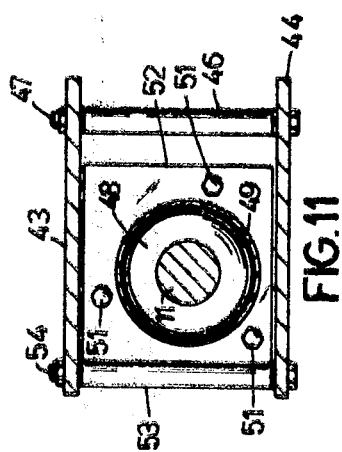

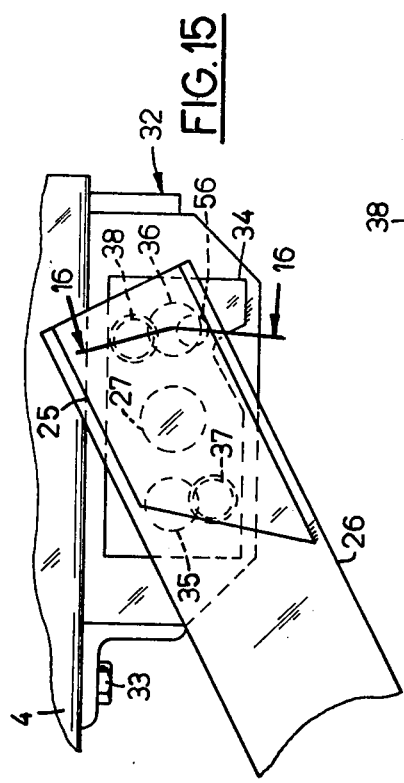
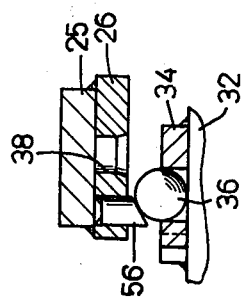
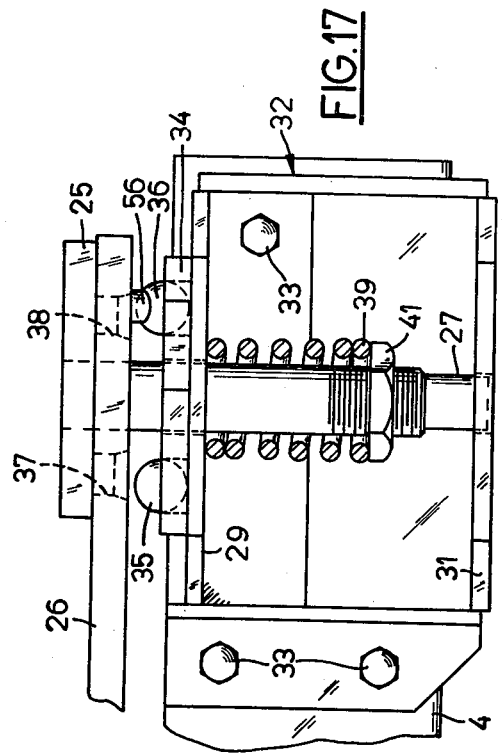
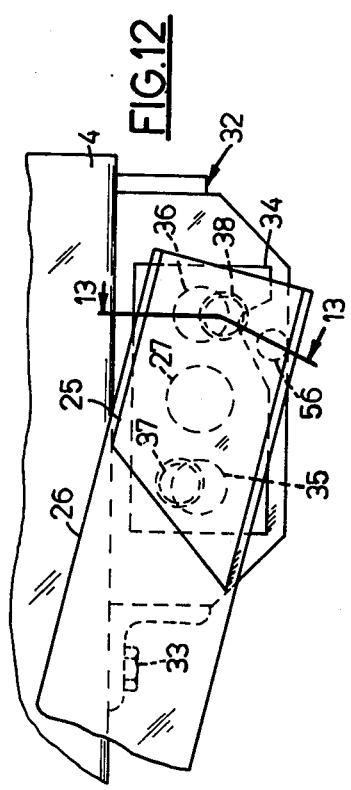
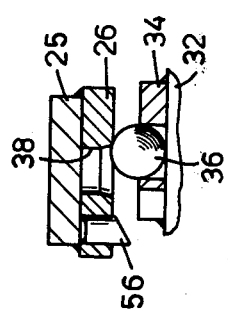
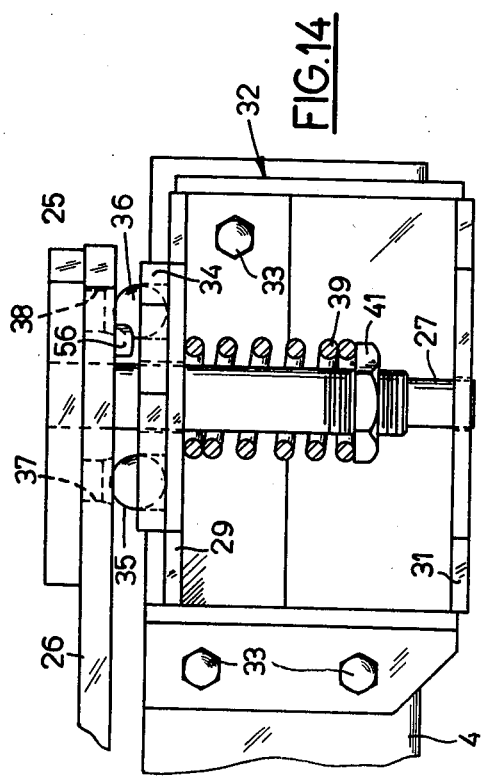

ARTICULATED VEHICLE ASSEMBLY

BACKGROUND OF THE INVENTION

The invention relates to farm machinery and it is concerned more particularly with an articulated vehicle assembly comprising a conventional farm tractor and a power take-off driven trailing implement. The use of the engine power of the tractor not only for driving its propelling wheels, but also for operating various types of implements on a trailing vehicle has long been an established practice. In such instances, the tractor and trailing vehicle are usually coupled together for relative horizontal turning movement about a pivot center on the tractor drawbar, and the tractor power take-off shaft and an implement drive shaft on the trailing vehicle are connected by articulated power transmitting shafting which accommodates turning of the tractor and trailer relative to each other about the pivot center on the drawbar.

An important requirement for the satisfactory operation of an articulated vehicle assembly of the mentioned character is the provision of articulated power transmitting shafting, which not only permits a reasonable amount of angular displacement of the tractor and trailer for steering, but which at the same time also keeps the implement drive shaft on the trailer running smoothly throughout the range angular displacement of the tractor and trailer, that is, without causing periodic fluctuations of the angular velocity of the implement drive shaft when the power transmitting shafting adjusts itself to accommodate the turning of the tractor and trailer about the pivot center on the drawbar.

In providing the required articulated shafting between the tractor power take-off shaft and the trailer mounted implement drive shaft, it has been customary during the past to universally pivot one section of a torque transmitting telescopic shaft assembly on the power take-off shaft, and to likewise pivot the other section of the telescopic shaft assembly on the trailer mounted implement drive shaft. However, for purposes of satisfactory tractor performance, it is necessary that the pivot center about which the tractor and trailer turn horizontally relative to each other, be kept at a relatively short horizontal distance from the rear end of the power take-off shaft. This dimensional requirement has heretofore made it difficult to provide an articulated telescopically extensible and contractible power line between the tractor and the trailing implement which is entirely satisfactory, particularly in the matter of providing an adequate range of horizontal, angular displacement of the tractor and trailer without causing periodic fluctuations of angular velocity of the implement drive shaft.

SUMMARY OF THE INVENTION

The present invention provides an improved, telescopically, extensible and contractible articulated power line for use between a tractor power take-off shaft and a trailer mounted implement drive shaft, which overcomes the short-comings and inadequacies of the prior art in a practical and entirely satisfactory manner.

More specifically, the invention provides an improved articulated vehicle assembly incorporating a telescopically extensible and contractible power line of the mentioned character, whereby the range of horizontal, angular displacement of the tractor and a power take-off driven trailing implement is enlarged beyond a normal range, in which rotation of the power take-off shaft is transmitted to the implement drive shaft at constant angular velocity.

The invention further provides an improved, articulated vehicle assembly of the mentioned character, wherein the horizontal spacing between the pivot center on the tractor drawbar, and the rear end of the power take-off shaft conforms with established requirements for satisfactory tractor performance, and wherein the horizontal spacing between the pivot center on the tractor drawbar and the front end of the trailer mounted implement drive shaft may be dimensioned in accordance with existing design requirements of the trailing vehicle.

With these considerations in mind, the invention contemplates the provision of an articulated power line incorporating a telescopically extensible and contractible shaft assembly between the tractor power take-off shaft and an extension of the implement drive shaft, and an adjustable guide assembly for the extension of the implement drive shaft, whereby the power line will accommodate a turning movement of the tractor relative to the trailing vehicle through an angle of somewhat less than 90° in either direction without causing objectionable, periodic fluctuations of the angular velocity of the implement drive shaft, and whereby the power line will also accommodate a 90° or larger turning movement of the tractor relative to the trailing vehicle.

DRAWINGS

The foregoing and other features and advantages of the invention will become more fully apparent as this disclosure proceeds with reference to the accompanying drawings where:

FIG. 4 illustrates the vehicle assembly of FIG. 3 in a right turn driving condition at a turning angle of somewhat less than 90°;

FIG. 5 illustrates the vehicle assembly of FIG. 3 in a right turn driving condition at a turning angle of 90° or more;

FIG. 6 illustrates the vehicle assembly of FIG. 3 in a left turn driving condition at a turning angle of somewhat less than 90°;

FIG. 7 illustrates the vehicle assembly of FIG. 3 in a left turn driving condition at a turning angle of 90° or more;

FIG. 9 is a top view of FIG. 8 partly in section on line 9—9 of FIG. 8;

FIG. 10 is a sectional view on line 10—10 of FIG. 9;

FIG. 11 is a sectional view on line 11—11 of FIG. 9;

FIG. 12 is an enlarged view of part of FIG. 5;

FIG. 13 is a section on line 13—13 of FIG. 12;

FIG. 14 is an elevational view of FIG. 12;

FIG. 15 is an enlarged view of part of FIG. 7;

FIG. 16 is a section on line 16—16 of FIG. 15; and

FIG. 17 is an elevational view of FIG. 15.

DETAILED DESCRIPTION

Figure 1:
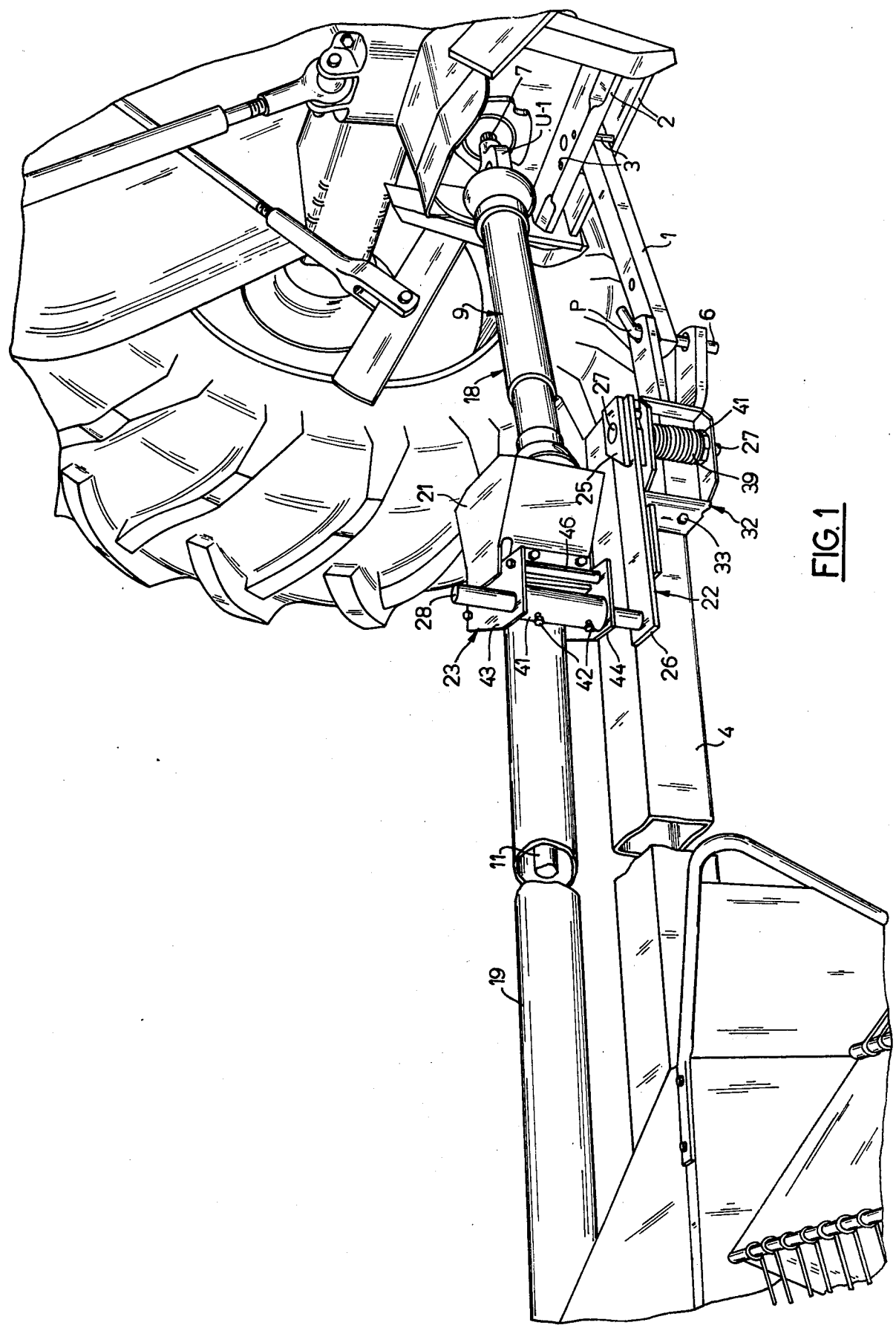
FIG. 1 is a perspective, partial view of an articulated vehicle assembly incorporating the invention.

FIG. 1 shows the rear part of a conventional farm tractor at the right and the forward part of a hay conditioner at the left, the hay conditioner representing a typical power take-off driven trailing implement which may be coupled to the tractor interchangeably with any other type of power take-off driven implement.

The tractor has a rearwardly extending drawbar 1 which is normally retained on the tractor body in a vertically and horizontally fixed position by conventional mounting means including a pair of cross bars 2 and straddle pins 3. The trailing implement has a forwardly projecting rigid draft tongue 4 which has a forked forward end overlapping the rear end of the drawbar 1. A manually insertable and withdrawable hitch pin 6 extends through aligned openings in the forked front end of the trailer draft tongue 4 and the tractor drawbar 1, and provides a pivot axis P on which the tractor and trailer may turn horizontally relative to each other for steering and other maneuvering of the vehicle assembly. The pivot pin 6 also permits angular displacement in a vertical plane between the tractor and trailer relative to each other during travel over uneven ground while the tractor and trailer are in straight ahead driving condition, as well as when they are in an angled condition about the pivot axis P.

Figures 2, 3:
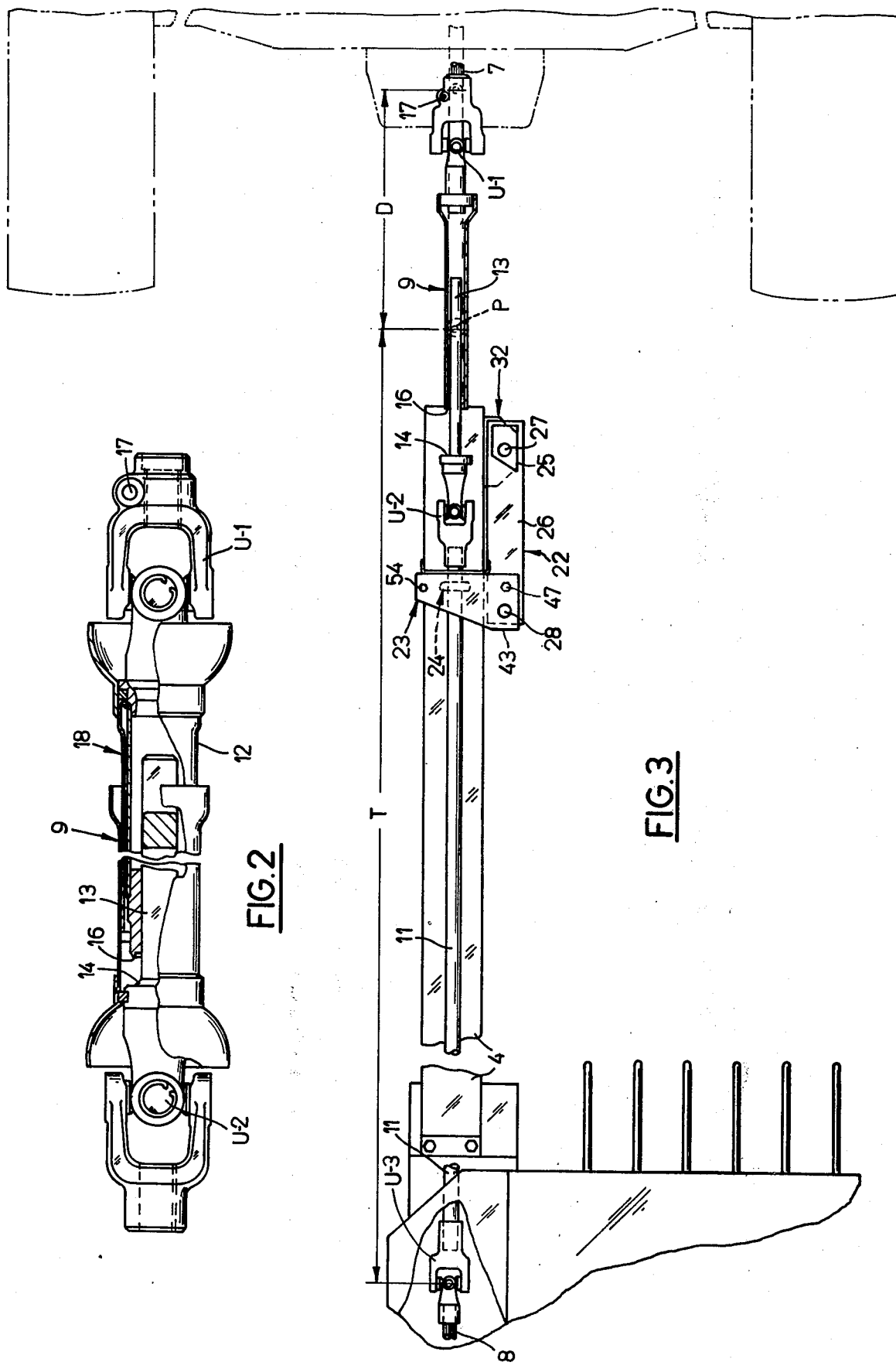
FIG. 2 is an enlarged sectional view of a telescopic shaft assembly and associated parts shown in FIG. 1.
FIG. 3 is a somewhat schematic top view of the vehicle assembly shown in FIG. 1, the assembly as shown in FIG. 3 illustrating a straight ahead driving condition.

The tractor has a conventional rear power take-off shaft 7, and as is well known in the art, the pivot axis P should have only a limited horizontal rearward spacing from the rear end of the power take-off shaft in order to preserve satisfactory tractor performance under various operating conditions. In FIG. 3 such limited rearward spacing is indicated by the reference character D. Two standardized dimensions for the spacing D have been generally adoped by the tractor industry, one being 14 inches for a 540 RPM power take-off shaft, and the other being 16 inches for a 1,000 RPM power take-off shaft.

The trailing implement (FIG. 3) has an axially fixed forwardly projecting implement drive shaft 8, and the horizontal forward spacing of the pivot axis P from the forward end of the implement drive shaft 8 is indicated by the reference character T. The dimension T may vary as dictated by design considerations and requirements of the trailing implement, and in the illustrated embodiment of the invention it is considerably longer than the dimension D.

Rotation of the power take-off shaft 7 is transmitted to the implement drive shaft 8 through an articulated power line comprising a torque transmitting telescopic shaft assembly 9 and an extension shaft 11 of the implement drive shaft 8. The telescopic shaft assembly as shown in FIG. 2 comprises a tubular section 12, a solid shaft section 13 of square cross section slidably and non-rotatably fitted into the tubular section 12 and front and mid universal joints U-1 and U-2 of conventional knuckle-type connected, respectively, to the tubular and solid shaft sections 12 and 13. Stop means for limiting contraction of the telescopic shaft assembly to a predetermined length comprise a shoulder 14 on the front fork of the rear universal U-2 and an annular end face 16 on the tubular shaft section 12.

As shown in FIG. 3, the front fork of the front universal joint U-1 is splined upon the power take-off shaft 7 and retained thereon in an axially fixed position by a releasable latch pin 17. The rear fork of the mid universal joint U-2 is splined upon and axially secured to the front end of the extension shaft 11, and the rear end of the extension shaft 11 is connected to the implement drive shaft 8 by a conventional knuckle type rear universal joint U-3. The telescopic shaft sections 12 and 13 are surrounded by a telescopic guard tube assembly 18 shown in FIGS. 1 and 2, but omitted in FIGS. 3-7. The extension shaft 11 and the mid universal joint U-2 are surrounded by a guard tube 19 and a bell housing 21, respectively, which are shown in FIG. 1, but omitted in FIGS. 3-7.

In operation, the telescopic shaft assembly 9 and the universal joints U-1, U-2 and U-3 accommodate horizontal turning of the tractor and trailing implement relative to each other about the pivot axis P. In the condition of the vehicle assembly as illustrated by FIG. 4, the tractor has been swung by a right hand turn about the pivot axis P to a position in which the telescopic shaft assembly 9 has been contracted to its minimum length in which the end face 16 (FIG. 2) of the tubular shaft section abuts the shoulder 14 of the solid shaft section 13. In that condition the pivot center of the front universal joint U-1 and the pivot center of the mid universal joint U-2 are spaced equal distances from the pivot axis P. That means that the base angles $a$ and $b$ of the triangle cornered at the pivot axis P and at the front and mid universal joints U-1 and U-2, are substantially identical and in accordance with well known kinematic principles, rotation of the power take-off shaft 7 will be transmitted to the extension shaft 11 and to the implement drive shaft 8 at constant angular velocity. This constant angular velocity condition will of course prevail at any angular displacement of the tractor relative to the trailer from the straight ahead driving condition of FIG. 3 to the angled position illustrated by FIG. 4.

While the angular range for a right hand turn as illustrated by FIG. 4 is somewhat less than 90°, it provides a reasonably satisfactory turning range under normal operating conditions of the vehicle assembly. However, a greater than 90° right hand turn of the tractor relative to the trailer may readily be accommodated as illustrated by FIG. 5. When the tractor swings from the FIG. 4 position to the FIG. 5 position, the contracted telescopic shaft assembly 9 pushes against the forward end of the extension shaft 11 and as a result the extension shaft 11 will be swung from the FIG. 4 position in which it extends in the direction of the draft tongue 4 to the FIG. 5 position, that is, to a position of horizontal anti-clockwise angular displacement about the pivot center of the rear universal joint U-3. Such displacement of the extension shaft 11 increases the angular range of turning movement of the tractor beyond the normal range illustrated by FIG. 4 within which rotation of the power take-off shaft is transmitted to the shafts 11 and 8 at constant angular velocity. When the tractor is turned to the right beyond the FIG. 4 position while the power take-off shaft continues to rotate at constant angular velocity, the angular velocity of the shafts 11 and 8 will begin to fluctuate and the resulting chatter will indicate to the tractor operator that he has oversteered the vehicle assembly.

The foregoing explanations with respect to a right turn of the tractor relative to the trailing vehicle are analogously applicable to a left turn as illustrated by FIGS. 6 and 7. A left turn of the tractor from the FIG. 3 position to the FIG. 6 position causes the telescopic shaft assembly 9 to bottom out and the base angles $a$ and b of the triangle cornered on the pivot axis P and on the pivot centers of the front and rear universal joints U–1 and U–2 remain equal throughout the turning of the tractor from the FIG. 3 to the FIG. 6 position. Consequently, rotation of the power take-off shaft will again be transmitted at constant angular velocity throughout a normal range of horizontal angular displacement of the tractor relative to the trailer. A greater than 90° left turn of the tractor will be accommodated as illustrated by FIG. 7, that is, by clockwise horizontal swinging movement of the extension shaft 11 about the pivot center of the rear universal joint U–3. Here again the angular velocity of the shafts 11 and 8 will begin to fluctuate when the tractor is turned to the left beyond the FIG. 6 position and the resulting chatter will indicate to the tractor operator that he has oversteered the vehicle assembly.

Means are provided for guiding the forward end of the extension shaft 11 horizontally about the pivot center of the rear universal joint U–3 when the tractor turns to the right or left from the straight ahead driving position illustrated by FIG. 3. Such guide means are illustrated by FIGS. 8 to 17 and comprise three principal components, namely a crank member 22 (FIG. 1), a bracket assembly 23, and a bearing assembly 24 (FIG. 9) within the bracket assembly 23.

Figure 8:
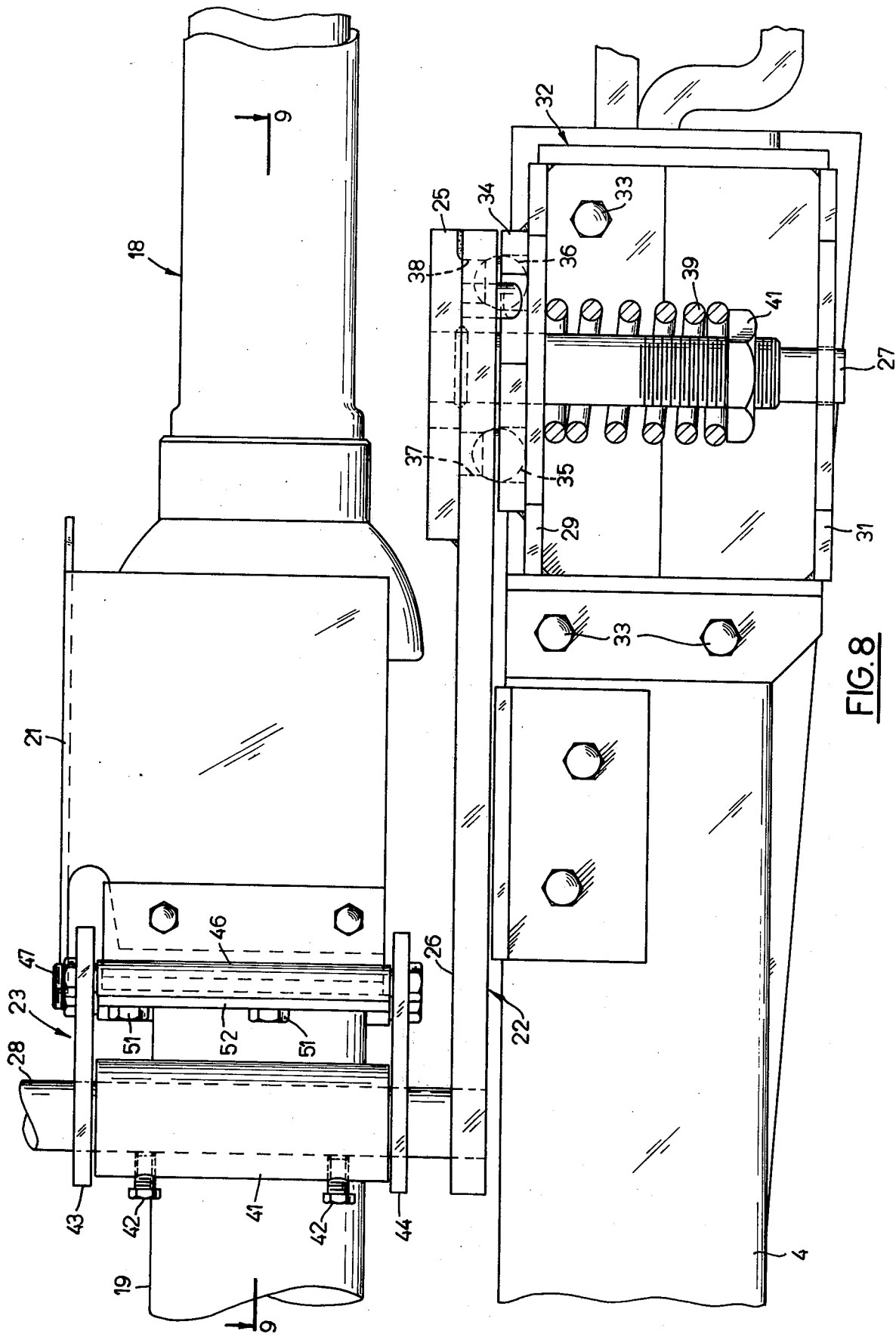
FIG. 8 is an enlarged elevational view of part of FIG. 1.

The crank member 22 comprises a crank plate 26 and a pair of parallel crank pins 27 and 28 which extend at a fixed radial spacing from each other in opposite directions from the cheek plate. The crank pin 27 is journaled on the implement draft tongue for back and forth horizontal swinging movement of the crank plate 26 above the top surface of the draft tongue. The crank pin 27 is secured by welding to the cheek plate 22 and to a reinforcing pad 25 thereon and it is rotatably fitted and axially slidable within vertically aligned openings of top and bottom walls 29 and 31 (FIG. 8) of a side-box 32 which is secured to the right side (FIG. 1) of the draft tongue 4 by cap screws 33 (FIG. 8).

A ball detent mechanism is operatively interposed between the crank member 22 and the side box 32 for releasably retaining the crank member in a predetermined pivotally adjusted position relative to the draft tongue 4. The detent mechanism comprises a ball seating plate 34 (FIG. 8) on top of and rigid with the side box 32, and two steel balls 35, 36 which are seated in pockets of the ball seating plate 34 at diametrically opposite spacings (FIG. 15) from the axis of the crank pin 27. At the same diametrically opposite spacings from the axis of the crank pin 27 complementary ball pockets 37 and 38 (FIG. 17) are formed at the under side of the crank plate 26. The ball pockets 37, 38 are flared as shown in FIGS. 13 and 16 to provide conical seating surfaces for the balls 35 and 36.

A coil spring 39 (FIG. 8) surrounds the crank pin 27 within the side box 32 and bears axially at one end against the underside of the top wall 29 and at the other end against a nut 41 on a threaded portion of the crank pin 27. In the assembled condition of the parts as shown in FIGS. 1 and 8, the ball pockets 37, 38 register with the balls 35 36, and the expanding pressure of the spring 39 holds the ball seating surfaces of the pockets 37, 38 down upon the balls 35 and 36, respectively. As a result, the crank member 22 (FIG. 1) is releasably locked in a rotatively adjusted position about the axis of the crank pin 27, in which the crank plate 26 extends generally parallel to the draft tongue 4 of the trailing vehicle.

The upwardly extending crank pin 28 (FIG. 1) is surrounded by an axially adjustable collar 41 which is secured to the pin 28 by two set screws 42. A support assembly which straddles the collar 41 comprises top and bottom plates 43, 44 of the bracket assembly 23 which are pivoted on the crank pin 28 and connected together at a fixed vertical spacing from each other by a tubular spacer 46 and a through bolt 47. In the space between the top and bottom plates 43, 44, a circular bearing block 48 is rotatably fitted around the extension shaft 11 in proximity to the rear fork of the mid universal joint U–2. The bearing block 48 is spherically seated in an axially split angular cage 49, and a peripheral flange of the cage 49 is secured by bolts 51 to the forward side of a generally square mounting plate 52 (FIG. 9). The plate 52 is hinged to the bracket assembly 23 on a vertical axis at a fixed radial spacing from the axis of the crank pin 28 by means of a tube 53 and a through bolt 54 extending through the top and bottom plates of 43, 44 of the bracket assembly 23.

While the tractor and the trailer are in the straight ahead driving condition as illustrated by FIG. 3, the crank member 22 is resiliently locked by the detent balls 35, 36 against horizontal swinging movement in either direction about the axis of the crank pin 27 from the position in which it is shown in FIG. 9 and in which the pivot centers of the front, middle and rear universal joints U–1, U–2, U–3 and the pivot axis P are in substantial alignment with each other as shown in FIG. 3.

When the tractor turns to the right from the FIG. 3 position to the FIG. 4 position the crank member 22 remains locked by the detent mechanism and the extension shaft 11 remains in the position of horizontal adjustment about the pivot center of the rear universal joint U–3 in which the axis of the extension shaft extends in the direction of the draft tongue 4.

Upon continued turning of the tractor to the right from the FIG. 4 position to the FIG. 5 position, the ball detent mechanism yields and the crank member 22 swings clockwise, as viewed in FIGS. 5 and 13, about the axis of the crank pin 27. During such clockwise swinging of the crank member 22 the mounting plate 52 (FIG. 9) pivots slightly about the axis of the vertical hinge pin 54 to accommodate the accompanying anticlockwise swinging movement of the extension shaft 11 about the pivot center of the rear universal joint U–3.

When the tractor turns back from the FIG. 5, to the FIG. 4 position on the telescopic shaft assembly 9 tends to elongate and its torque causes clockwise swinging of the shaft 11 and crank member 22 to the FIG. 4 position, and the ball 36 returning to its seat biases the crank assembly to its FIG. 4 position also.

When the tractor turns to the left from the FIG. 3 position to the FIG. 6 position the crank member 22 again remains locked by the detent mechanism and the extension shaft 11 remains in the position of horizontal adjustment about the pivot center of the rear universal joint U–3 in which the axis of the shaft 11 extends in the direction of the draft tongue 4.

Upon continued turning of the tractor to the left from the FIG. 6 position to the FIG. 7 position the detent mechanism yields and the crank member 22 swings anticlockwise, as viewed in FIGS. 7 and 15, about the axis of the crank pin 27. During such anticlockwise swinging of the crank member 22 the mounting plate 52

(FIG. 9) again pivots slightly about the axis of the vertical hinge pin 54 in order to accommodate the accompanying clockwise swinging movement of the extension shaft 11 about the pivot center of the rear universal joint U–3.

When the tractor swings from the FIG. 7 position back to the FIG. 6 position, the telescopic shaft assembly tends to elongate, and automatic turning means are provided to bias the movement of the crank member 22 clockwise about the axis of the crank pin 27 toward its resiliently locked angularly adjusted position as shown in FIG. 6 when the tractor returns to the straight ahead driving position. Such automatic turning means comprise a stud 56 (FIG. 16) which is secured to the crank plate 26 and projects downwardly therefrom at the same radial spacing from the axis of the crank pin 27 as the ball pocket 38. The axis of the stud 56 is angularly spaced from the ball pocket 38 and the lower end face of the stud 56 is slanted so that the stud will ride up on the ball 36 which is seated in the ball seating plate 34, when the crank member 22 swings anti-clockwise, as viewed in FIG. 15, about the axis of the crank pin 27. The crank member 22 is thereby forced to move slightly upward away from the ball seating plate 34 against the expanding pressure of the coil spring 39. In the condition of the parts as illustrated by FIGS. 15 and 16, the slanting end face of the stud 56 and the spherical surface of the ball 36, therefore, react upon each other so as to produce a clockwise torque upon the crank member 22. This clockwise torque becomes effective to return the crank member 22 from its FIG. 7 position to its FIG. 6 position while the tractor turns clockwise from the FIG. 7 to the FIg. 6 position. The stud 56 actually extends the range of the conical surface of the hole 38 and thereby affords an enlarged left turn capacity of the vehicle assembly.

The guard tube 19 (FIG. 1) for the extension shaft 11 and the bell housing 21 for the mid-universal joint U–2 are suitably connected to the support plate 52 and the rear end of the guard tube 19 is swingably supported on the trailing vehicle by suitable structure, not shown, so as to accommodate horizontal back and forth movement of its front end when the crank member 22 swings clockwise or anti-clockwise about the axis of the crank pin 27, and also to accommodate up and down movement of the front end of the guard tube 19 when the bracket assembly 23 is raised or lowered by up or down adjustment of the collar 41 on the crank pin 28.

I claim:

1. An articulated vehicle assembly comprising a tractor having a rear power take-off shaft and a vertically and horizontally fixed drawbar projecting rearwardly beyond said power take-off shaft; a trailing implement having a vertically and horizontally fixed, forwardly projecting draft tongue, hitch means connecting said implement draft tongue to said tractor drawbar on a pivot center at a fixed rearward spacing from the rear end of said power take-off shaft; a forwardly extending drive shaft on said trailing implement having a forward end spaced rearwardly from said pivot center a greater distance than said rearward spacing of the latter from said power take-off shaft; an extension shaft universally pivoted at one end thereof to said implement drive shaft; a torque transmitting telescopic shaft assembly universally pivoted at one end to said power take-off shaft and at its other end to the other end of said extension shaft; and guide means for said other end of said extension shaft operatively mounted on said draft tongue whereby said extension shaft is sustained on said implement in horizontally back and forth swingable relation thereto about its pivot connection with said implement drive shaft.

2. An articulated vehicle assembly as set forth in claim 1, wherein said guide means comprise a bearing structure rotatably connected with said extension shaft; and vertically adjustable supporting means for said bearing structure.

3. An articulated vehicle assembly comprising a tractor having a rear power take-off shaft and a vertically and horizontally fixed drawbar projecting rearwardly beyond said power take-off shaft; a trailing implement having a vertically and horizontally fixed, forwardly projecting draft tongue, hitch means connecting said implement draft tongue to said tractor drawbar on a pivot center at a fixed rearward spacing from the rear end of said power take-off shaft; a forwardly extending drive shaft on said trailing implement having a forward end spaced rearwardly from said pivot center a greater distance than said rearward spacing of the latter from said power take-off shaft; an extension shaft universally pivoted at its rear end to said implement drive shaft; guide means for the forward end of said extension shaft operatively mounted on said draft tongue whereby said extension shaft is sustained on said implement in horizontally back and forth swingable relation thereto about its pivot connection with said implement drive shaft; and a torque transmitting telescopic shaft assembly universally pivoted at its opposite ends to said power take-off shaft and to said forward end of said extension shaft, said telescopic shaft assembly including stop means limiting its contraction to a predetermined length which, upon relative horizontal turning movement of said tractor and implement about said pivot center of said hitch means, will maintain the pivot connection between said extension shaft and the adjacent end of said telescopic shaft assembly at the same spacing from said pivot center as the spacing of the latter from the pivot connection between said power take-off shaft and the adjacent end of said telescopic shaft assembly.

4. An articulated vehicle assembly as set forth in claim 3 and further comprising detent means operatively associated with said guide means whereby said extension shaft is releasably locked against horizontal swinging movement about its pivot connection with said implement drive shaft from a forward extending position.

5. An articulated vehicle assembly as set forth in claim , wherein said guide means includes a crank member pivoted on said draft tongue for horizontal back and forth movement relative thereto, and bearing means for said extension shaft jointed to said crank member for horizontal back and forth movement therewith relative to said draft tongue.

6. An articulated vehicle assembly as set forth in claim 5 wherein said crank member comprises a crank portion and parallel crank pins extending at a fixed radial spacing from each other in opposite directions from said crank portion; one of said crank pins being journalled on said draft tongue so as to position said crank portion for horizontal back and forth swinging movement relative to said draft tongue, and said bearing means for said extension shaft being pivotally supported on the other of said crank pins.

7. An articulated vehicle assembly as set forth in claim 6 wherein said bearing means for said extension shaft are rotatably connected with said other crank pin in axially adjustable relation thereto.

8. An articulated vehicle assembly as set forth in claim 6 wherein a collar is secured to said other crank pin in axially adjustable relation thereto; and wherein a support assembly straddling said collar comprises top and bottom plates pivoted on said other crank pin, a hinge pin extending between said top and bottom plates at a radial spacing from said other crank pin, and a bearing structure rotatably connected with said extension shaft and pivotally connected with said hinge pin.

9. An articulated vehicle assembly as set forth in claim 5, and further comprising resilient detent means operatively interposed between said draft tongue and said crank member for releasably retaining the latter in a predetermined pivotally adjusted position relative to said draft tongue.

10. An articulated vehicle assembly as set forth in claim 7, wherein said detent means and said crank member are operatively interrelated so that said extension shaft will be releasably locked against horizontal swinging movement about its pivot connection with said implement drive shaft from a forwardly extending position.

11. An articulated vehicle assembly as set forth in claim 7 and further comprising automatic turning means operatively associated with said crank member for biasing the latter toward said predetermined pivotally adjusted position relative to said draft tongue.

* * * * *